(12) United States Patent
Hayslip

(10) Patent No.: US 8,425,706 B2
(45) Date of Patent: Apr. 23, 2013

(54) JOINT DESIGN FOR WELDING PLASTIC ASSEMBLIES

(75) Inventor: Jason M. Hayslip, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 523 days.

(21) Appl. No.: 12/712,741

(22) Filed: Feb. 25, 2010

(65) Prior Publication Data

US 2011/0206898 A1    Aug. 25, 2011

(51) Int. Cl.
*B29C 65/08*    (2006.01)

(52) U.S. Cl.
USPC .......................... 156/73.1; 156/293; 156/298

(58) Field of Classification Search .............. 156/73.1, 156/293, 297, 298, 308.2, 309.6
See application file for complete search history.

(56) References Cited

U.S. PATENT DOCUMENTS

| 6,752,886 B2 * | 6/2004 | Distel .............................. 156/64 |
| 6,913,666 B1 * | 7/2005 | Aeschlimann et al. ...... 156/73.1 |

* cited by examiner

*Primary Examiner* — James Sells
(74) *Attorney, Agent, or Firm* — Dinsmore & Shohl LLP

(57) ABSTRACT

A weldable component is described. The weldable component includes a weld rivet attached by a thin portion, which is designed to break during the ultrasonic welding process. The weld rivet is driven through a complementary void pocket which extends through the part and is positioned under the weld rivet. The weld rivet is embedded in the base component to form the weld. A welded joint and a method for ultrasonic welding using the weldable component are also described.

8 Claims, 2 Drawing Sheets

JOINT DESIGN FOR WELDING PLASTIC ASSEMBLIES

BACKGROUND OF THE INVENTION

This invention relates generally to ultrasonic welding, and more particularly to a joint design and a method for welding plastic assemblies.

Figure 1:
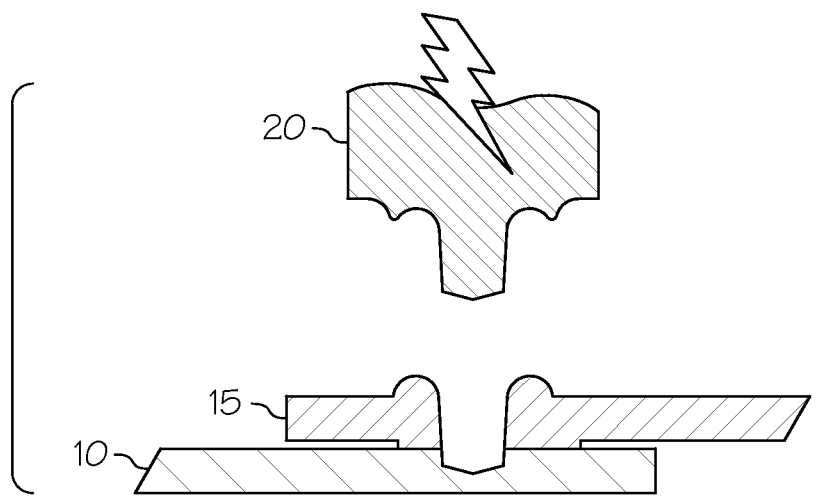

Various methods for welding plastic parts are known. Current ultrasonic welding techniques include spot welding and energy director welding. In a spot welding joint, the parts are stationary during the welding process. As shown in FIG. 1, the weldable component 15 is placed on the base component 10. The ultrasonic welding tool 20 penetrates the weldable component 15 and the base component 10 in order to form the spot weld joint. When filled plastics, such as glass filled nylon and the like, are spot welded, the tool is subject to severe wear. Consequently, the tool has to be made of extremely hard materials, which are often exotic and expensive, and it must be replaced frequently. In addition, with spot welding no space or gap can be tolerated between the parts to be joined. Also, the cosmetic appearance of spot welded joints is undesirable for some applications. Moreover, spot welded joints can lack the strength and mechanical properties required for certain applications.

Figure 2A:
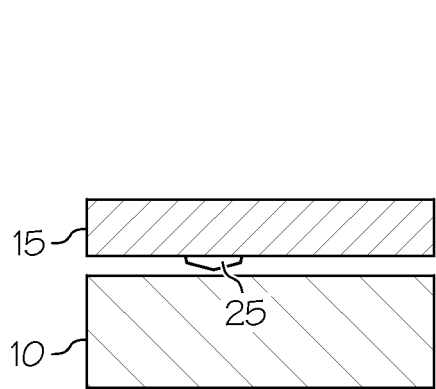
Figure 2B:
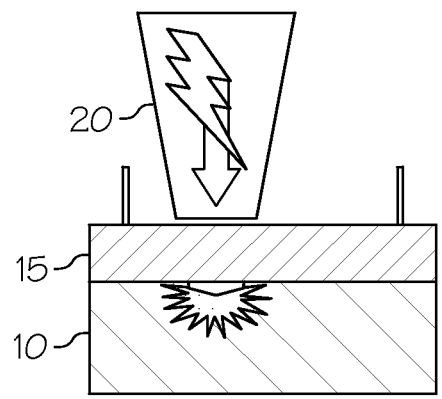

Other welding processes require relative motion between the parts to be welded. For example, with a joint made using energy director welding, the weldable component moves relative to the base component, as illustrated in FIGS. 2A-B. The weldable component 15 is positioned above the base component 10 with a gap between them. An energy director feature 25 extends downward from the weldable component 15. The ultrasonic welding tool 20 is applied to the upper surface of the weldable component 15 forcing it downward against the base component 10 where the energy director feature forms the weld. Because this method requires that the weldable component move during the welding process, it can result in misaligned welds.

Therefore, there is a need for a welding technique which does not require relative motion during the welding process and which does not penetrate the assembly to be welded.

SUMMARY OF THE INVENTION

The present invention solves this need by providing an improved weldable component, weld joint, and method of welding. The weldable component includes a weld rivet attached by a thin portion, which is designed to break during the ultrasonic welding process. The weldable component has a complementary void pocket positioned under the weld rivet which extends through the part. The weld rivet is driven through the complementary void pocket and embedded in the base component to form the weld.

One aspect of the invention is a weldable component. In one embodiment, the weldable component includes a thermoplastic part having a first surface, a weld rivet attached to the part by a thin portion, the weld rivet extending above the first surface, and a complementary void pocket positioned under the weld rivet, the complementary void pocket extending through the part, wherein the weld rivet fits into the complementary void pocket.

Another aspect of the invention is a welded joint between a base component and a weldable component. In one embodiment, the welded joint includes: a base component having a surface to be welded; a weldable component comprising a part having a complementary void pocket extending through the part, and a weld rivet positioned in the complementary void pocket and ultrasonically welded to the surface of the base component.

Another aspect of the invention is a method for ultrasonic welding. In one embodiment, the method includes: providing a base component having a surface to be welded; providing a weldable component comprising a part having a first surface, a weld rivet attached to the part by a thin portion, the weld rivet extending above the first surface, and a complementary void pocket positioned under the weld rivet, the complementary void pocket extending through the part, wherein the weld rivet fits into the complementary void pocket; placing the weldable component on the base component; and applying an ultrasonic welding tool to the weld rivet and the first surface of the part, breaking the weld rivet off the part, driving the weld rivet through the complementary void pocket and into the base component, and ultrasonically welding the weldable component to the surface of the base component with the weld rivet.

BRIEF DESCRIPTION OF THE INVENTION

Figure 3A:
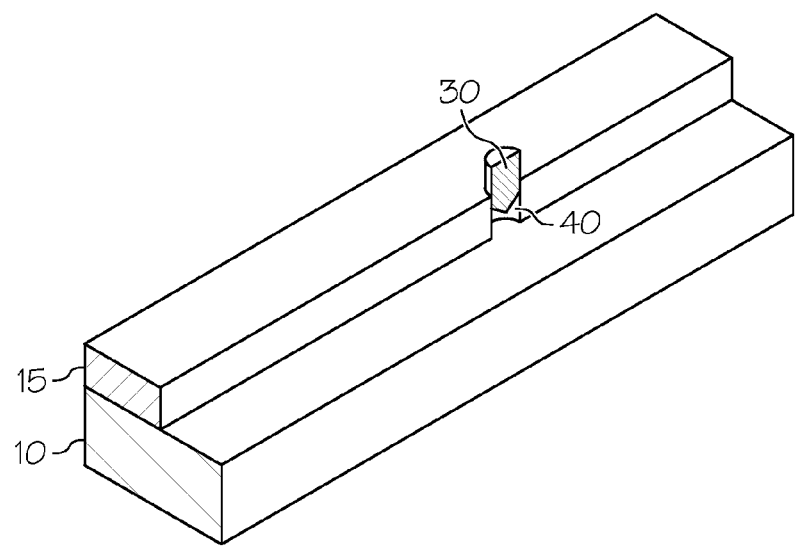
Figure 3B:
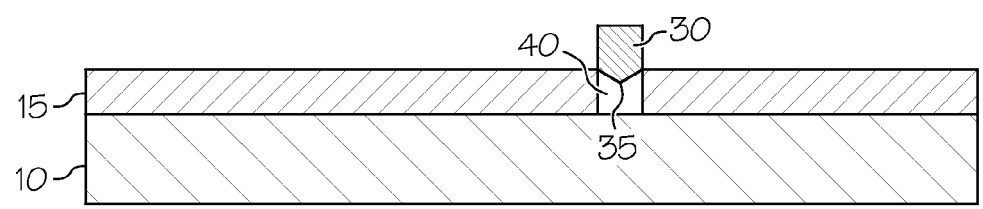
Figure 3C:
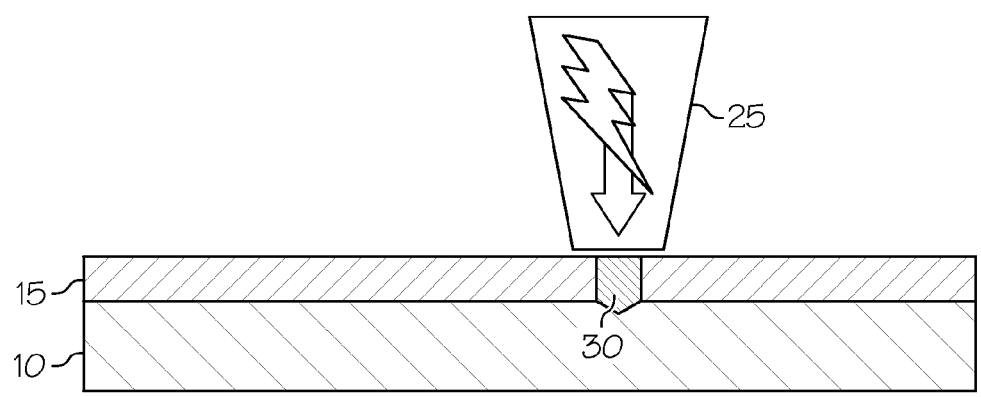

FIG. 1 is an illustration of a prior art spot welding method.
FIGS. 2A-B are illustrations of a prior art energy director welding method.
FIGS. 3A-C are an illustration of one embodiment of the claimed method.

DETAILED DESCRIPTION OF THE INVENTION

An improved weld joint and method of welding are provided. A weld rivet is molded in place as a part of the weldable component. This eliminates the use of an additional component in the welding process, which is undesirable. The weld rivet is joined to the main body of the weldable component by a thin area of plastic. It is designed to break free during the ultrasonic welding process, allowing it to move in line with the weld force and embed in the base component. This allows the assembled components to remain stationary and to be held in place accurately during the welding process. The weld tooling does not penetrate the assembly, which reduces the significant tool wear issues for filled materials. In addition, part fit-up is less critical than with a spot weld. It is possible to weld components even when there is a gap between them because the rivet is capable of moving until contact with the base component. Furthermore, the present welding process will leave less surface disruption compared to the spot weld process.

FIG. 3 is an illustration of one embodiment of the method. There is a base component 10 and a weldable component 15. A weld rivet 30 extends above the upper surface of the weldable component 15, and is molded as part of the thermoplastic weldable component 15.

The weld rivet 30 is connected to the weldable component 15 by a thin portion of material, such as a thin area of plastic. The thin portion is much thinner than the weld rivet or the weldable component. It should be thin enough that it is easily broken when the weld rivet is contacted by the ultrasonic welding tool. The size and shape of the thin portion will depend on the size and geometry of the weld joint. In many situations, it would be less than about one third the height of the weld rivet. The thin portion could be a continuous web, or multiple non-continuous segments. The weld rivet will perform better with a very thin connection to the part. However, this can cause difficulty in getting the part to fill completely during manufacture. As a result, these factors should be balanced in designing the weld rivet and the connecting portion.

The area of connection between the weldable component and the weld rivet should be a high stress area. The high stress area will be dependent on the size of the joint and the application. A high stress area could be accomplished with a relatively small radius at the connection point or some other shape that focuses weld energy to break the rivet loose. As an example, the weld rivet can be attached to the weldable component at a sharp corner, which is a high stress area. The angle between the upper surface of the part and the weld rivet is typically in the range of about 70° to about 110°, or about 80° to about 100°, or about 85° to about 105°. The transition radius should be small so that the corner is sharper rather than more rounded. The actual dimensions will depend on the size of the components. Other designs resulting in high stress areas are known to those of skill in the art.

The attachment of the weld rivet to the weldable component will depend on the design of the part and the weld rivet. Those of skill in the art can design appropriate connections.

The weld rivet can have any shape desired, including, but not limited to, circular, square, rectangular, triangular, star-shaped, and the like, or combinations thereof. The design of the weld rivet will be affected by a number of factors, such as the weld strength of the particular shape, the part design, the requirements of the application, and the like. Those of skill in the art can select an appropriate design for the weld rivet.

The weld rivet 30 can include a spiked energy director 35, if desired. The energy director is shaped to provide welding energy into the base component during the welding process. The energy director increases the strength and reliability of the bond by concentrating the contact surface area between the weld rivet and base component for application of the ultrasonic energy. Providing a concentrated contact area increases the ability to control the location and quality of the bond and establishes a locale for the flow of material melted by the ultrasonic energy to begin.

There is a complementary void pocket 40 in the weld component which generally corresponds to the shape of the weld rivet 30. The weld rivet fits into the complementary void pocket. It is typically the same size and shape as the weld rivet. The complementary void pocket can be slightly smaller than the weld rivet, if desired. This arrangement would provide high stress areas on the sides of the weld rivet and the complementary void pocket so that the weld rivet forms a weld with the weldable component on the sides of the complementary void pocket as well as with the base component. Alternatively, the outside of the weld rivet or the inside of the complementary void pocket can include ribs, sharp edges, or the like to provide high stress areas in the complementary void pocket.

The weldable component 15 is placed on the base component 10. An ultrasonic welding tool 25 with a mating geometry comes down on the weld rivet 30. The portion connecting the weld rivet 30 to the weldable component 15 is melted, causing the weld rivet 30 to break free from the weldable component 15. The ultrasonic welding tool 25 continues downward, driving the weld rivet 30 down through the complementary void pocket 40 in the weldable component 15 and into the base component 10. The energy director 35 of the weld rivet 30 creates a high stress area on the base component 10, resulting in formation of the weld joint between the weld rivet 30 and the base component. As discussed above, with an appropriate design of the weld rivet and complementary void pocket, a weld joint can also be formed between the outside surface of the weld rivet and the complementary void pocket, if desired.

The weld joint does not require relative motion between the base component and the weldable component during the welding process, which allows more precise welding. It also provides a better appearance of the weld joint than spot welding.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method for ultrasonic welding comprising:
    providing a base component having a surface to be welded;
    providing a weldable component comprising a part having a first surface, a weld rivet attached to the part by a thin portion, the weld rivet extending above the first surface, and a complementary void pocket extending through the part and positioned under the weld rivet, wherein the weld rivet fits into the complementary void pocket;
    placing the weldable component on the base component; and
    applying an ultrasonic welding tool to the weld rivet and the first surface of the part, breaking the weld rivet off the part, driving the weld rivet through the complementary void pocket and into the base component, and ultrasonically welding the weldable component to the surface of the base component with the weld rivet.

2. The method of claim 1 wherein a side of the weld rivet or a side of the complementary void pocket has a high stress area, and further comprising ultrasonically welding the weld rivet to the weldable component in the complementary void pocket.

3. The method of claim 1 wherein the thin portion is less than about one third of a height of the weld rivet.

4. The method of claim 1 wherein the weld rivet has an energy director feature.

5. The method of claim 1 wherein the weld rivet has a shape selected from circular, square, rectangular, triangular, star-shaped, or combinations thereof.

6. The method of claim 1 wherein an angle between the first surface and the weld rivet is about 70° to about 110°.

7. The method of claim 1 wherein the thin portion has a high stress area.

8. The method of claim 1 wherein the thin portion is a continuous web or at least two non-continuous segments.

* * * * *